United States Patent

Krug

[11] Patent Number: 5,863,084
[45] Date of Patent: Jan. 26, 1999

[54] LIFTING AID DEVICE FOR A SHOVEL

[76] Inventor: Richard D. Krug, 601 S. 5th St., Oregon, Ill. 61061

[21] Appl. No.: 985,414
[22] Filed: Dec. 4, 1997
[51] Int. Cl.$^6$ ........................................................ A01B 1/00
[52] U.S. Cl. ........................................... 294/59; 254/131.5
[58] Field of Search ........................ 294/49, 54.5, 57–60; 16/114 R, 111 R; 254/131.5, 132

[56] References Cited

U.S. PATENT DOCUMENTS

| | | | |
|---|---|---|---|
| 607,154 | 7/1898 | Berck | 294/58 |
| 931,387 | 8/1909 | Conde | 254/131.5 |
| 1,529,835 | 3/1925 | Hamilton | 294/57 |
| 1,563,528 | 12/1925 | Rubio | 294/60 |
| 1,658,963 | 2/1928 | Bergquist | 294/60 |
| 2,269,119 | 1/1942 | Mason | 254/131.5 |
| 2,497,771 | 2/1950 | Hirst | 254/131.5 |
| 3,222,699 | 12/1965 | Zeisig | 295/57 X |

FOREIGN PATENT DOCUMENTS

| | | | |
|---|---|---|---|
| 1378370 | 10/1964 | France | 294/59 |
| 319898 | 4/1920 | Germany | 254/131.5 |

*Primary Examiner*—Johnny D. Cherry

[57] ABSTRACT

A new lifting aid device for a shovel for helping a user to easily lift a shovel, in particular a shovel having an offset type handle. The inventive device includes a brace member with an elongate shaft portion and a rest portion. The mounting end of the shaft portion is mountable to a portion of an offset-type handle shaft of a shovel. The inner surface of the rest portion is designed for abutting a portion of a leg, such as a thigh, against it. The pivot end of the shaft portion is pivotally coupled to the outer surface of the rest portion at a midpoint between the upper and lower edges of the rest portion to allow proper pivoting of the rest portion during use.

8 Claims, 2 Drawing Sheets

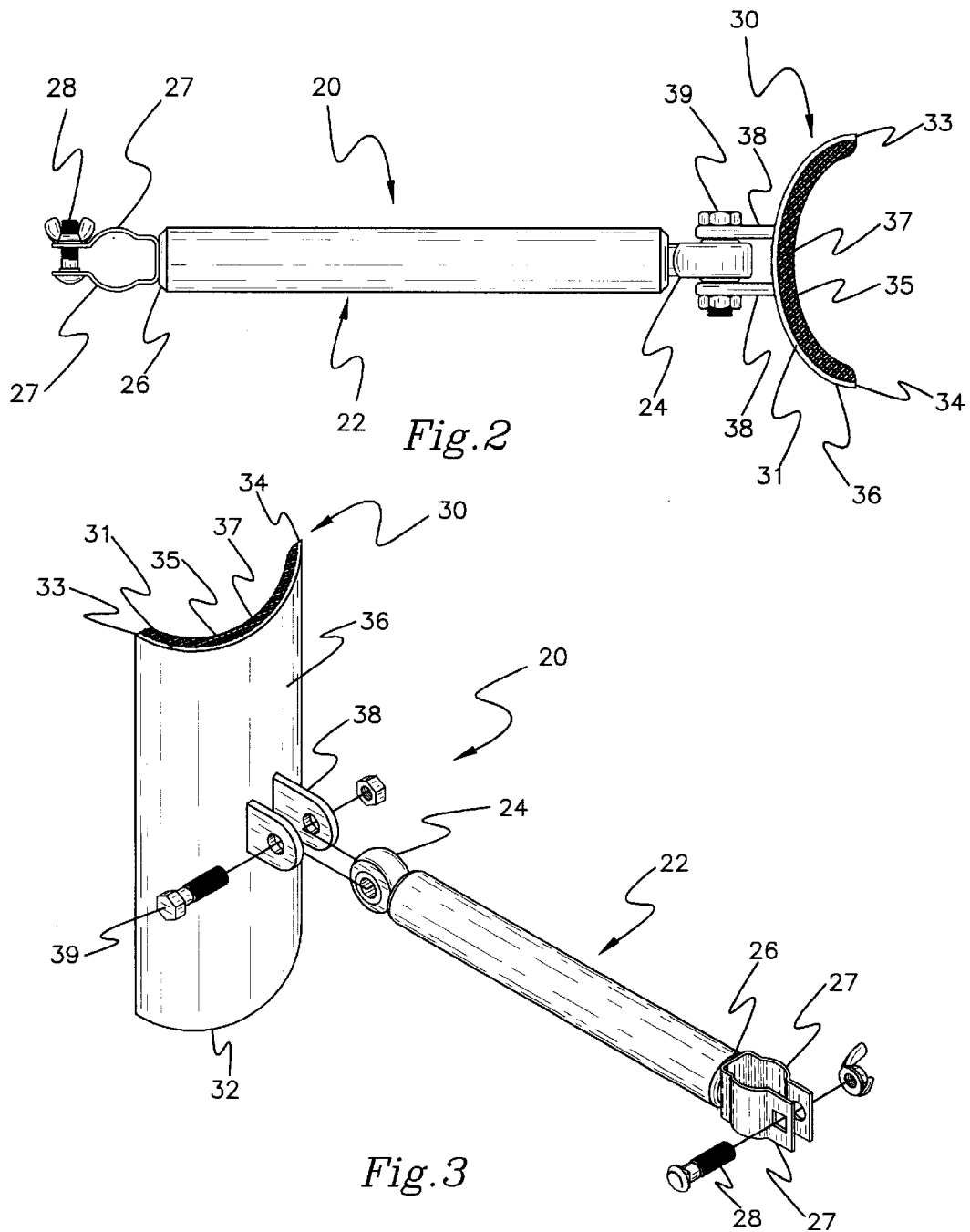

LIFTING AID DEVICE FOR A SHOVEL

BACKGROUND OF THE INVENTION

1. Field of the Invention

The present invention relates to shovel devices and more particularly pertains to a new lifting aid device for a shovel for helping a user to easily lift a shovel, in particular an shovel having an offset type handle.

2. Description of the Prior Art

The use of shovel devices is known in the prior art. More specifically, shovel devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art shovel devices include U.S. Pat. No. 4,231,604; U.S. Pat. No. 5,419,600; U.S. Pat. No. 4,865,373; U.S. Pat. No. 5,039,151; U.S. Pat. No. 4,199,181; and U.S. Pat. No. Des. 291,273.

While these devices fulfill their respective, particular objectives and requirements, the aforementioned patents do not disclose a new lifting aid device for a shovel. The inventive device includes a brace member with an elongate shaft portion and a rest portion. The mounting end of the shaft portion is mountable to a portion of an offset-type handle shaft of a shovel. The inner surface of the rest portion is designed for abutting a portion of a leg, such as a thigh, against it. The pivot end of the shaft portion is pivotally coupled to the outer surface of the rest portion at a midpoint between the upper and lower edges of the rest portion to allow proper pivoting of the rest portion during use.

In these respects, the lifting aid device for a shovel according to the present invention substantially departs from the conventional concepts and designs of the prior art, and in so doing provides an apparatus primarily developed for the purpose of helping a user to easily lift a shovel, in particular an shovel having an offset type handle.

SUMMARY OF THE INVENTION

In view of the foregoing disadvantages inherent in the known types of shovel devices now present in the prior art, the present invention provides a new lifting aid device for a shovel construction wherein the same can be utilized for helping a user to easily lift a shovel, in particular an shovel having an offset type handle.

The general purpose of the present invention, which will be described subsequently in greater detail, is to provide a new lifting aid device for a shovel apparatus and method which has many of the advantages of the shovel devices mentioned heretofore and many novel features that result in a new lifting aid device for a shovel which is not anticipated, rendered obvious, suggested, or even implied by any of the prior art shovel devices, either alone or in any combination thereof.

To attain this, the present invention generally comprises a brace member with an elongate shaft portion and a rest portion. The mounting end of the shaft portion is mountable to a portion of an offset-type handle shaft of a shovel. The inner surface of the rest portion is designed for abutting a portion of a leg, such as a thigh, against it. The pivot end of the shaft portion is pivotally coupled to the outer surface of the rest portion at a midpoint between the upper and lower edges of the rest portion to allow proper pivoting of the rest portion during use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lifting aid device for a shovel apparatus and method which has many of the advantages of the shovel devices mentioned heretofore and many novel features that result in a new lifting aid device for a shovel which is not anticipated, rendered obvious, suggested, or even implied by any of the prior art shovel devices, either alone or in any combination thereof.

It is another object of the present invention to provide a new lifting aid device for a shovel which may be easily and efficiently manufactured and marketed.

It is a further object of the present invention to provide a new lifting aid device for a shovel which is of a durable and reliable construction.

An even further object of the present invention is to provide a new lifting aid device for a shovel which is susceptible of a low cost of manufacture with regard to both materials and labor, and which accordingly is then susceptible of low prices of sale to the consuming public, thereby making such lifting aid device for a shovel economically available to the buying public.

Still yet another object of the present invention is to provide a new lifting aid device for a shovel which provides in the apparatuses and methods of the prior art some of the advantages thereof, while simultaneously overcoming some of the disadvantages normally associated therewith.

Still another object of the present invention is to provide a new lifting aid device for a shovel for helping a user to easily lift a shovel, in particular an shovel having an offset type handle.

Yet another object of the present invention is to provide a new lifting aid device for a shovel which includes a brace member with an elongate shaft portion and a rest portion. The mounting end of the shaft portion is mountable to a portion of an offset-type handle shaft of a shovel. The inner surface of the rest portion is designed for abutting a portion of a leg, such as a thigh, against it. The pivot end of the shaft portion is pivotally coupled to the outer surface of the rest portion at a midpoint between the upper and lower edges of the rest portion to allow proper pivoting of the rest portion during use.

Still yet another object of the present invention is to provide a new lifting aid device for a shovel that allows a user to use their leg muscles more efficiently when lifting a shovel.

Even still another object of the present invention is to provide a new lifting aid device for a shovel that helps reduce back strain and stress to the heart when lifting a shovel.

Even yet still another object of the present invention is to provide a new lifting aid device for a shovel that is easily attachable to existing shovels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side view of the present invention.

FIG. 3 is a schematic exploded perspective view of the present invention.

DESCRIPTION OF THE PREFERRED EMBODIMENT

Figure 1:
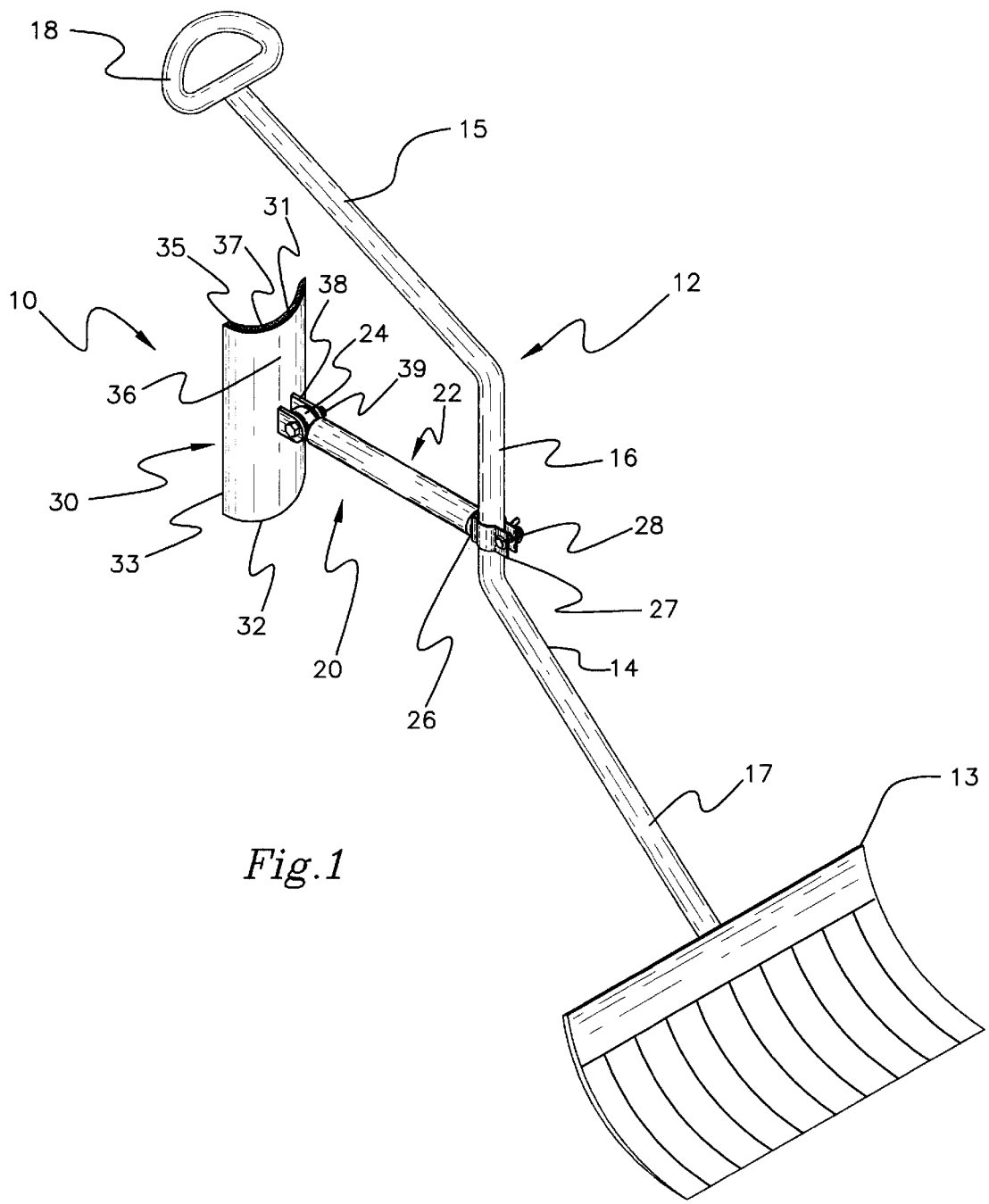
FIG. 1 is a schematic perspective view of a new lifting aid device for a shovel mounted to the offset-type shaft of a shovel according to the present invention.

With reference now to the drawings, and in particular to FIGS. 1 through 3 thereof, a new lifting aid device for a shovel embodying the principles and concepts of the present invention and generally designated by the reference numeral 10 will be described.

As best illustrated in FIGS. 1 through 3, the lifting aid device for a shovel 10 generally comprises a brace member 20 with an elongate shaft portion 22 and a rest portion 30. The mounting end 26 of the shaft portion 22 is mountable to a portion 16 of an offset-type handle shaft 14 of a shovel 12. The inner surface 35 of the rest portion 30 is designed for abutting a portion of a leg, such as a thigh, against it. The pivot end 24 of the shaft portion 22 is pivotally coupled to the outer surface 36 of the rest portion 30 at a midpoint between the upper and lower edges 31,32 of the rest portion 30 to allow proper pivoting of the rest portion 30 during use.

With reference to FIG. 1, the shovel lifting aid device 10 is preferably designed for mounting to a shovel 12 having an offset-type elongate handle shaft 14, although the device 10 may be used on any type of shovel. The handle shaft 14 has elongate lower, middle and upper portions 17,16,15 with the upper portion 15 and the lower portion 17 being extended from either end of the middle portion 16 at obtuse angles from the middle portion 16. The blade 13 of the shovel 12 is coupled to the lower end of the handle shaft 14. Ideally, the shovel 12 includes an annular gripping handle 18 coupled to the upper end of the handle shaft 14.

As shown in FIG. 3, the brace member 20 has an elongate rest portion 30 and an elongate shaft portion 22. The mounting end 26 of the shaft portion 22 is mounted to the middle portion 16 of the handle shaft 13. Preferably, the mounting end 26 has a pair of spaced apart clamping arms 27 outwardly extending from it between which the middle portion 16 of the handle shaft 14 is inserted. A fastener 28 is provided for releasably fastening the ends of the clamping arms 27 together to hold the middle portion 16 between the clamping arms 27.

The inner surface 35 of the rest portion is designed for abutting a portion of a leg, such as a thigh, against it. Preferably, the inner surface 35 includes a padded layer 37 for providing additional comfort. As shown in FIGS. 2 and 3, the pivot end 24 of the shaft portion 22 is pivotally coupled to the outer surface 36 of the rest portion 30. Preferably, the pivot end 24 is coupled at a midpoint between the upper and lower edges 31,32 of the rest portion 30 so that the rest portion 30 pivots properly and fully when a leg is abutting it while in use. Ideally, the outer surface 36 has a pair of spaced apart pivot brackets 38 extending from it with the pivot end 24 of the shaft portion 22 positioned between the pivot brackets 38 and pivotally coupled to the pivot brackets 38 by a fastener 39.

The rest portion 30 has first and second side edges 33,34 being extended between its upper and lower edges 31,32. Preferably, the inner surface 35 of the rest portion 30 is arcuate, that is a concave curve, such that the first and second side edges 33,34 curve towards one another and outwardly from the pivot end 24 of the shaft portion 22 to help embrace a leg being abutted against the inner surface 35. Ideally, the outer surface 36 is also arcuate in a convex manner.

In use, the user grasps the handle shaft 14 of the shovel with one hand and the gripping handle 18 with the other hand. The user then abuts their thigh or portion of their leg against the inner surface 35 of the rest portion 30 when pushing or lifting the shovel 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination:

a brace member having a rest portion and an elongate shaft portion;

said shaft portion being generally cylindrical and having a mounting end and a pivot end, said mounting end being mountable to a portion of an offset-type handle shaft of a shovel;

said shaft portion having a longitudinal axis extending between said mounting end and said pivot end of said shaft portion;

said rest portion having upper and lower edges, elongate first and second side edges, an inner surface and an outer surface, said first and second side edges being extended between said upper and lower edges, said inner surface being for abutting a portion of a leg thereagainst, said pivot end of said shaft portion being pivotally coupled to said outer surface at a midpoint between said upper and lower edges;

said inner surface being adapted for abutting a length of a leg thereagainst:

said inner surface having a generally arcuate horizontal cross section such that said arcuate cross section has a radius of curvature lying in a generally horizontal plane and such that first and second side edges curve towards one another and outwardly from said pivot end of said shaft portion to define an elongate channel adapted to help embrace a length of the leg abutted against said inner surface;

said mounting end having a pair of spaced apart clamping arms outwardly extending therefrom;

each of said clamping arms having an arcuate proximal portion and a generally planar distal portion;

said arcuate proximal portions of said clamping arms being interposed between said mounting end of said shaft portion and said generally planar distal portions;

each of said arcuate proximal portions having a concavity, said concavities of said arcuate proximal portions facing one another, said arcuate proximal portions being adapted for receiving a portion of the handle shaft of a shovel;

said generally planar distal portions generally lying in parallel planes extending generally parallel to said longitudinal axis of said shaft portion;

each of said generally planar distal portions having an aperture therethrough, said apertures of said generally planar distal portions being generally coaxial to one another;

said aperture of one of said generally planar distal portions having a generally rectangular periphery, said aperture of another of said generally planar distal portions having a generally circular periphery; and a threaded fastener being extended through said apertures in said generally planar distal portions and having a nut threaded thereon for fastening said generally planar distal portions together to hold the handle shaft between said clamping arms.

2. The combination of claim 1, wherein said inner surface has a padded layer extending substantially across the entire inner surface between said end edges and between said side edges of said resting portion for providing additional comfort to the entire length of the leg abutting against the inner surface.

3. The combination of claim 1, wherein said outer surface is arcuate.

4. The combination of claim 1, further comprising a shovel having a blade and an elongate handle shaft, and wherein said mounting end of said shaft portion of said brace member is mounted to said handle shaft.

5. The combination of claim 4, wherein said shovel has an annular gripping handle being coupled to said upper end of said handle shaft.

6. The combination of claim 4, wherein said handle shaft has opposite upper and lower ends, an elongate lower portion, an elongate middle portion, and an elongate upper portion, said upper portion of said handle shaft being extended from said middle portion at an obtuse angle, said lower portion of said handle shaft being extended from said middle portion at an obtuse angle, said blade of said shovel being coupled to said lower end of said handle shaft, and wherein said mounting end of said shaft portion of said brace member is mounted to said middle portion of said handle shaft.

7. The combination of claim 1, wherein said outer surface has a pair of spaced apart pivot brackets extending therefrom, said pivot end of said shaft portion being positioned between said pivot brackets, said pivot end being pivotally coupled to said pivot brackets.

8. A shovel lifting aid device, comprising:

a shovel having a blade and an offset-type elongate handle shaft, said handle shaft having opposite upper and lower ends, an elongate lower portion, an elongate middle portion, and an elongate upper portion, said upper portion of said handle shaft being extended from said middle portion at an obtuse angle, said lower portion of said handle shaft being extended from said middle portion at an obtuse angle, said blade of said shovel being coupled to said lower end of said handle shaft, said shovel having an annular gripping handle being coupled to said upper end of said handle shaft;

a brace member having an elongate rest portion and an elongate shaft portion;

said shaft portion having a mounting end and a pivot end, said mounting end being mounted to said middle portion of said handle shaft; and said rest portion having upper and lower edges, elongate first and second side edges, an inner surface and an outer surface, said first and second side edges being extended between said upper and lower edges, said inner surface being for abutting a portion of a leg thereagainst, said inner surface having a padded layer, said pivot end of said shaft portion being pivotally coupled to said outer surface at a midpoint between said upper and lower edges, said inner surface being arcuate such that said first and second side edges curve towards one another and outwardly from said pivot end of said shaft portion to help embrace a leg being abutted against said inner surface, said outer surface being arcuate.

* * * * *